(12) United States Patent
Marshall et al.

(10) Patent No.: US 7,901,662 B2
(45) Date of Patent: Mar. 8, 2011

(54) STEAM GENERATION APPARATUS AND METHOD

(75) Inventors: Terry Allen Marshall, Corpus Christi, TX (US); Mark Irl Chambers, Corpus Christi, TX (US); Robert El Wade, Manvel, TX (US)

(73) Assignee: Celanese International Corporation, Dallas, TX (US)

( * ) Notice: Subject to any disclaimer, the term of this patent is extended or adjusted under 35 U.S.C. 154(b) by 1156 days.

(21) Appl. No.: 11/264,126

(22) Filed: Nov. 1, 2005

(65) Prior Publication Data

US 2007/0098627 A1 May 3, 2007

(51) Int. Cl.
*C01B 3/24* (2006.01)

(52) U.S. Cl. ......... 423/650; 423/651; 423/652; 423/653; 423/654

(58) Field of Classification Search ........... 423/650, 423/651, 652, 653, 654
See application file for complete search history.

(56) References Cited

U.S. PATENT DOCUMENTS

| | | | | |
|---|---|---|---|---|
| 4,530,886 A * | 7/1985 | Sederquist | ................. | 429/13 |
| 4,816,353 A * | 3/1989 | Wertheim et al. | ............. | 429/19 |
| 5,857,322 A * | 1/1999 | Cohn | ................. | 60/39.182 |
| 6,619,041 B2 * | 9/2003 | Marin et al. | ................. | 60/653 |
| 7,028,478 B2 * | 4/2006 | Prentice, III | ................. | 60/645 |
| 7,205,060 B2 * | 4/2007 | Kaye et al. | ................. | 429/25 |
| 2002/0086260 A1 * | 7/2002 | Shang et al. | ................. | 432/247 |
| 2003/0110693 A1 * | 6/2003 | Drnevich et al. | ........... | 48/197 R |
| 2005/0247430 A1 * | 11/2005 | Gast | ................. | 165/10 |
| 2006/0149114 A1 * | 7/2006 | Colman et al. | ................. | 585/658 |

FOREIGN PATENT DOCUMENTS

WO   WO 2004/074222   * 9/2004

OTHER PUBLICATIONS

Smith et al. "Introduction to Chemical Engineering Thermodynamics", pp. 678-696, The McGraw-Hill Companies, 1996.*
Smith et al. "Introduction to Chemical Engineering Thermodynamics", p. 668, The McGraw-Hill Companies, 1996.*

* cited by examiner

*Primary Examiner* — Jessica L Ward
*Assistant Examiner* — Paul A Wartalowicz

(57) ABSTRACT

Provided herein is a process for generating steam comprising supplying a first stream to a steam reformer to produce a second stream comprising essentially 100% steam such that the molecular composition of the first stream is identical to the molecular composition of second stream, wherein the steam reformer comprises a reformer inlet in fluid communication with a reformer outlet, and at least one tube arranged between, and in fluid communication with the reformer inlet and the reformer outlet; and wherein the at least one tube is in thermal communication with a furnace of the steam reformer. A steam reformer for producing steam is also disclosed.

24 Claims, 3 Drawing Sheets

STEAM GENERATION APPARATUS AND METHOD

FIELD OF THE DISCLOSURE

This disclosure relates to systems and processes for producing steam using a modified steam reformer.

BACKGROUND OF THE DISCLOSURE

A known method of reforming gaseous or liquid hydrocarbon fuels is by catalytic steam reforming. In this process, a mixture of steam and the hydrocarbon fuel is exposed to a suitable catalyst at a high temperature. The catalyst used typically contains a nickel oxide deposited on a low silica refractory base and the process usually takes place at a temperature between about 700° C. and about 1000° C. The catalyst is typically placed in tubes in a furnace and the reaction is carried out by passing the gas through the catalyst. Methane or other hydrocarbons react with steam in the reactor tubes to form carbon monoxide (CO), carbon dioxide ($CO_2$), and hydrogen.

In the case of reforming processes for methane or natural gas (the reformation process), hydrogen is liberated in a catalytic steam reforming process according to the following overall reactions:

$$CH_4 + H_2O \rightarrow CO + 3H_2$$

$$CO + H_2O \rightarrow CO_2 + H_2$$

While the second reaction is slightly exothermic, the first reaction is highly endothermic and requires an external source of heat and a steam source. The heat required is typically supplied by the combustion of refinery fuel gas, pressure swing adsorber (PSA) purge gas, and/or other fuel gases. Commercial steam reformers typically comprise externally heated, catalyst filled tubes and typically have thermal efficiencies of 60% or less. However, certain stream reformers have higher efficiencies. Exemplary high efficiency reformers are produced and sold by Davy Powergas.

Another conventional method of reforming a gaseous or liquid hydrocarbon fuel is partial oxidation reforming. In partial oxidation reforming, a mixture of the hydrocarbon fuel and an oxygen containing gas are brought together within a partial oxidation chamber and subjected to an elevated temperature, preferably in the presence of a catalyst. The catalyst used is normally a noble metal or nickel and the high temperature is normally between about 700° C. and about 1200° C. for catalyzed reactions, and about 1200° C. to about 1700° C. for non-catalyzed reactions. In the case of methane or natural gas, hydrogen is liberated in a partial oxidation chamber according to the following overall reaction:

$$CH_4 + \tfrac{1}{2}O_2 \rightarrow CO + 2H_2$$

This reaction is highly exothermic and once started generates sufficient heat to be self-sustaining. No external heat supply or steam supply is required. The catalytic partial oxidation reforming technique is simpler than the catalytic steam reforming technique, but is not as thermally efficient as catalytic steam reforming.

Another method of reforming a hydrocarbon fuel is autothermal reforming, or "ATR". An autothermal reformer uses a combination of steam reforming and partial oxidation reforming. Waste heat from the partial oxidation reforming reaction is used to heat the thermally steam reforming reaction. An autothermal reformer may in many cases be more efficient than either a catalytic steam reformer or a catalytic partial oxidation reformer. Using methane, or natural gas, as the hydrocarbon fuel, hydrogen is liberated according to the following overall reaction:

$$CH_4 + yH_2O + (1-y/2)O_2 \rightarrow CO_2 + (2+y)H_2, \text{ where } 0 < y < 2$$

The end product of the reformation process is typically referred to as synthesis gas. Synthesis gas (syn gas) from the various reforming processes discussed above may be used in a variety of secondary processes. For example, synthesis gases may be used in a processes that combines carbon monoxide and hydrogen to form methanol in the presence of a catalyst.

Of course, it is also well know to use the heat of various processes in an industrial facility to produce steam to generate electricity for other processes within the facility. Exemplary systems that use hot exhaust gases and steam from various industrial processes including the formation of synthesis gas using a steam reformer to produce electricity are disclosed in U.S. Pat. Nos. 6,619,041 and 5,066,325.

Many industrial facilities, particularly in the United States, which have steam reformers for the production of carbon monoxide and hydrogen for use in methanol production, now have relatively inexpensive sources of methanol available. For the operator of many of these industrial facilities, it is more economically attractive to purchase the methanol and other products downstream of steam reformers from a supplier than is to produce the methanol and the like from synthesis gases generated by steam reformers.

As such, a need exists to utilize the exiting steam reformers in a way in which the large capital expenditures associated with these systems may be recouped, while providing a benefit to the facility in which the steam reformer is situated. In these types of facilities, the systems and processes described herein are particularly useful to provide economically attractive alternative uses for stream reformers that represent fixed capital costs for the facility.

SUMMARY OF THE DISCLOSURE

This disclosure relates to systems and processes for the efficient production of steam for use in various industrial processes. The systems and processes are provided by modifying and/or retrofitting a system that includes at least one existing steam reformer. In an aspect of the present invention, a process for generating steam comprises the steps of:

(i) supplying a first stream to a steam reformer,
wherein the first stream comprises essentially 100 wt. % water;
has a temperature of about 185° C. or greater;
a pressure of about 1150 kPa or greater; and
at least about 50 wt % of the first stream is in the form of steam;
wherein the steam reformer comprises a reformer inlet in fluid communication with a reformer outlet, and at least one tube arranged between, and in fluid communication with the reformer inlet and the reformer outlet; and
wherein the at least one tube is in thermal communication with a furnace of the steam reformer;

(ii) heating at least a portion of said first stream within said at least one tubes to produce a second stream comprising essentially 100 wt % steam at a temperature of about 760° C. or greater and at a pressure of 1150 kPa or greater such that the molecular composition of the first stream is identical to the molecular composition of second stream; and (iii) removing said second stream from said outlet of said steam reformer.

In another aspect of the present invention, a process for generating steam comprises the steps of:

(i) supplying a first stream to a steam reformer,
wherein the first stream comprises essentially 100 wt. % water;
has a temperature of about 450° C. to about 550° C.;
a pressure of about 1150 kPa to about 4600 kPa; and
at least about 80 wt % of the first stream is in the form of steam;
wherein the steam reformer comprises a reformer inlet in fluid communication with a reformer outlet, and a plurality of tubes are arranged between, and in fluid communication with the reformer inlet and the reformer outlet;
wherein an inert packing material is dimensioned and arranged with each of the plurality of tubes to provide a turbulent flow within the first stream, the packing material comprising ceramic balls, cylinders, saddles, pellets, natural stones, natural gravel, or a combination thereof having a diameters of about 8 mm to about 50 mm; and wherein the tubes are in thermal communication with a furnace of the steam reformer;

(ii) heating at least a portion of said first stream within said at least one tubes to produce a second stream comprising essentially 100 wt % superheated steam at a temperature of about 760° C. or greater and at a pressure of 1150 kPa or greater such that the molecular composition of the first stream is identical to the molecular composition of second stream; and (iii) removing said second stream from said outlet of said steam reformer.

In yet another aspect of the present invention a process for producing steam comprises the steps of:

supplying a first stream to a steam reformer wherein the first stream comprises essentially 100 wt. % water, has a temperature of about 185° C. or greater, and a pressure of about 1150 kPa or greater, wherein at least about 80 wt % of the first stream is in the form of steam;
means for heating the first stream in the steam reformer to produce a second stream having a higher temperature than the first stream wherein the molecular composition of the first stream is identical to the molecular composition of second stream; and
means for removing the second stream from an outlet of the steam reformer.

In still another aspect of the present invention, a steam reformer for producing steam comprises a reformer inlet in fluid communication with a reformer outlet, and a plurality of tubes arranged between, and in fluid communication with the reformer inlet and the reformer outlet;
wherein an inert packing material is dimensioned and arranged with each of the plurality of tubes to provide a turbulent flow within the first stream, the packing material comprising ceramic balls, cylinders, saddles, pellets, natural stones, natural gravel, or a combination thereof having a diameters of about 8 mm to about 50 mm; and
wherein the tubes are in thermal communication with a furnace of the steam reformer.

The systems and processes described are particularly useful for producing steam in facilities having a steam reformer previously used to produce synthesis gases for purposes such as methanol production and in which the need for such synthesis gases is no longer present or is diminished.

DETAILED DISCLOSURE

Figure 1:
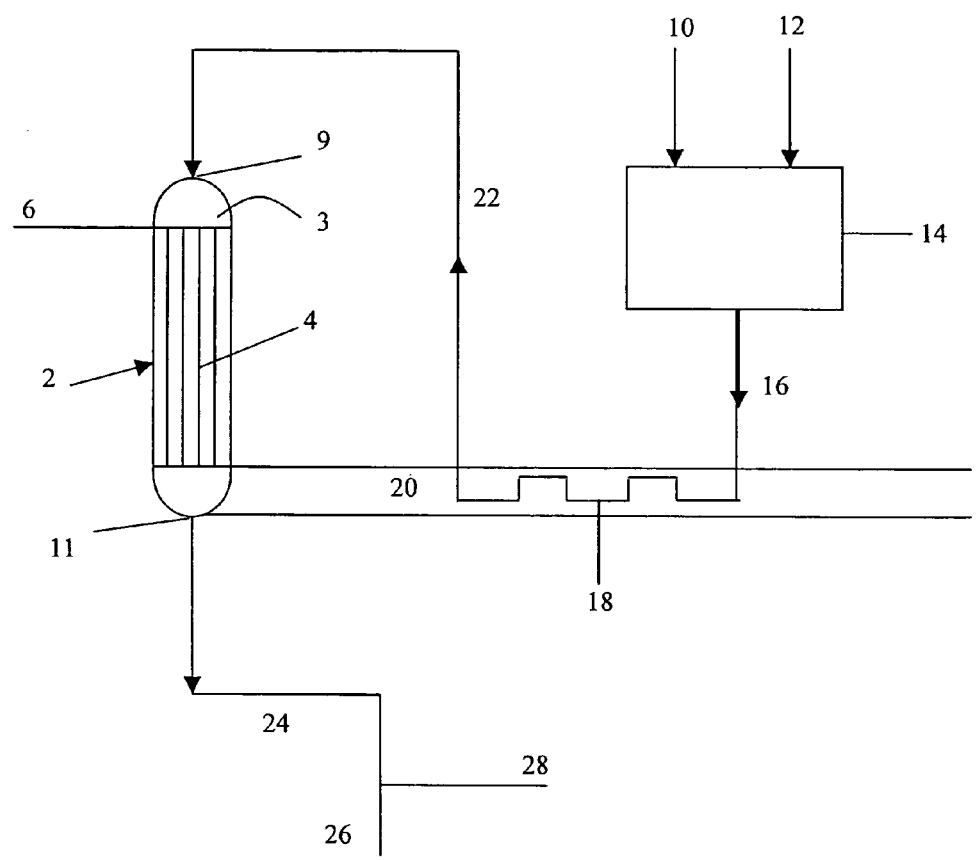
FIG. 1 is a schematic representation of a conventional reformer system apparatus system.

This disclosure relates to systems and processes for the efficient production of steam for use in various industrial processes. The systems and processes described herein make use of steam reformers designed for synthesis gas production to produce steam for a variety of purposes. Generally steam reformers are very expensive to build and maintain. Consequently, there are generally less expensive alternatives available for use in industrial facilities for the general production of steam. However, in facilities in which the use for an existing steam reformer is no longer necessary for synthesis gas production, it has been discovered that such a steam reformer may provide an efficient generator of large quantities of steam. Therefore, the systems and processes described herein provide an economically attractive retrofit or modification of systems that include at least one existing steam reformer, to produce steam for various industrial uses.

Types of steam reformers suitable for use according to the present invention include tubular reformers, autothermal reformers, adiabatic reformers, cyclic reformers, and the like. The primary difference between these reformers is the manner in which heat is supplied for the endothermic reforming reaction. In a tubular reformer, heat is supplied through the walls of a cylinder to the catalyst material (see for example U.S. Pat. No. 4,098,589.) In an autothermal reformer, heat is supplied to the catalyst bed directly by the heated gases entering the reformer (see for example, U.S. Pat. No. 3,976,507.) In a cyclic reformer, a plurality of reformers are operated simultaneously with one set of reformers operating under a combustion phase (reacting fuel and air) to provide the necessary heat for the hydrogen production phase, while another set of reformers is operated under the hydrogen production phase (reacting hydrocarbon and steam), with a switching of phases when the temperature of the reformers in the hydrogen production phase drops below that necessary to sustain hydrogen production (see for example U.S. Pat. No. 4,293, 315.) In an adiabatic reformer, a conventional heat exchanger is utilized to supply the requisite heat to the steam and hydrocarbon prior to passage into the steam reformer. In general, suitable steam reformers need merely comprise a reformer inlet in fluid communication with a reformer outlet, and one or more tubes arranged between, and in fluid communication with the reformer inlet and the reformer outlet. The one or more tubes is preferably in thermal communication with a furnace or other source of heat supplied to the steam reformer. Accordingly, the one more tubes are often located within a firebox of the steam reformer. For purposes herein, the one or more tubes are used generically to represent a reformer section, wherein the feed stock of the steam reformer was previously contacted with a catalyst in the presence of heat to effect the reformation process wherein the feed was converted into the product. Accordingly, the one or more tubes need not be restricted to tubes having a circular cross section, but include any of the various arrangements of structures and surfaces wherein a feed for a steam reformer was converted into synthesis gas, or other products consistent with typical steam reformer operation.

In the systems and processes described herein, a first stream is supplied to an inlet of the steam reformer, which is then heated within the steam reformer to produce a second stream. Preferably, the first stream is supplied to the steam reformer at a temperature of about 185° C. to about 350° C. and at a pressure of about 1150 kPa to about 4600 kPa. The first stream may comprise essentially 100 wt % water, and may contain at least 50 wt %, preferably at least 80 wt. % steam, with any remaining portion of the first stream including free (liquid) water.

This is in contrast to streams directed to a conventional steam reformer, which may contain from about 74% water to about 77 wt. % water in the form of steam. Of course, some of the steam in the conventional reformer stream is consumed in the conversion of the hydrocarbon stream within the reformer. However, generally the stream exiting a steam reformer operated in the production of synthesis gas contains from about 45 wt. % to about 53 wt. % of excess steam. This steam is typically recovered from the synthesis gas produced in the steam reformer in a later purification step.

In the systems and processes described herein, the reformer apparatus is used to convert a first stream at a temperature of about 185° C. to about 350° C. and a pressure of about 1,150 kPa to about 4,600 kPa containing essentially 100 wt % water, wherein from about 80 wt. % to about 100 wt. % of the water is in the form of steam, with any non-steam portion including free water, to a second stream comprising essentially 100 wt. % steam at a temperature of about 760° C. to about 900° C. and a pressure of about 1,150 kPa to about 4,600 kPa. Of course, higher temperatures and pressures of both the first stream and the second product stream are within the scope of the present invention, and depend upon the requirements of the systems in the environment where a particular steam reformer is operated.

Use of a steam reformer for the general production of steam as described herein may provide for more efficient production of steam as compared to conventional systems such as boilers, etc. Efficiency of steam production is determined in terms of the amount of actual steam production in proportion to the amount of heat theoretically possible from the fuel source used in the production of the heat supplied to the steam reformer. Such methods are well known in the art. Of course, the efficiency of the production of the steam according to the present invention will depend on the design of a particular steam reformer. However, steam reformers according to the presently invention preferably produce steam at efficiency rates of at least 60%, preferably at least 70%, preferably at least 80%, more preferably at least about 83%. Whereas, conventional steam production systems, such as gas fired boilers typically produce steam at efficiency rates of less than about 83%.

It has been unexpectedly discovered that the convection heat recovery section of a typical steam reformer is generally oversized relative to a conventional boiler utilized for steam production. This attribute of steam reformers is believed to allow for enhanced thermal efficiency as compared to conventional steam production systems.

However, even if the existing steam reformer apparatus is incapable of producing steam at a high efficiency rate, the present invention remains a viable alternative as such an apparatus retrofitted and/or operated as described herein may present a source of reliable steam at capital cost of less than expanding or building steam generation facilities.

In an embodiment of the present invention, a process for generating steam comprises the steps of:

(i) supplying a first stream to a steam reformer,
 wherein the first stream comprises essentially 100 wt. % water; has a temperature of about 185° C. to about 350° C.; a pressure of about 1150 kPa to about 4600 kPa; and at least about 80 wt % of the first stream is in the form of steam;
 wherein the steam reformer comprises a reformer inlet in fluid communication with a reformer outlet, and at least one tube arranged between, and in fluid communication with the reformer inlet and the reformer outlet; and
 wherein the at least one tube is in thermal communication with a furnace of the steam reformer;

(ii) heating at least a portion of said first stream within said at least one tubes to produce a second stream comprising essentially 100 wt % steam at a temperature of about 760° C. to about 900° C. and at a pressure of 1150 kPa to about 4600 kPa; and (iii) removing said second stream from the outlet of the steam reformer.

Prior art FIG. 1 provides a schematic representation of a conventional steam reformer apparatus as an integral part of a steam reformer system. A conventional steam reformer 2 may typically include a firebox or furnace 3 in thermal communication with one or more catalyst filled tubes 4 through which a mixture of steam and hydrocarbon gas may be directed from a reformer inlet 9 to a reformer outlet 11. A fuel gas source 6 provides energy to maintain furnace 3, and thus reformer 2 at a temperature of about 900° C. to about 1,050° C. In the embodiment shown, a combustion air source 8 is provided to reformer 2 to supply oxygen to furnace 3.

In a typical operation, a hydrocarbon gas stream 10 such as a methane fuel gas stream is mixed and heated with a water stream containing steam and/or excess water 12 in a device such as a moisturizer 14. The mixture is then removed from moisturizer 14 as mixed stream 16. Mixed stream 16 is then typically preheated as it travels through heat exchangers/piping 18, which may be positioned within an exhaust gas 20 of steam reformer 2 produced in furnace 3. Mixed steam 16 is heated to produce a preheated stream 22. The molar ratio of steam (i.e., $H_2O$) to carbon in preheated stream 22 typically ranges from 2.6 to 3.2. Accordingly, the water present in preheated stream 22 typically ranges from 74 wt. % to 77 wt. %, based on the total weight of mixed stream 16. Preheated stream 22 may then be directed through reformer inlet 9, and through catalyst filled tubes 4, wherein mixed stream 16 is heated within reformer 2 and the above described reformation reaction takes place to produce synthesis gas.

Accordingly, under typical steam reformer operation, within catalyst filled tubes 4, methane, and smaller amounts of other hydrocarbons, and water delivered in preheated stream 22 are converted to carbon monoxide, carbon dioxide, and hydrogen in accordance with the formula set forth above to produce a wet synthesis gas steam 24 containing excess steam. The excess steam may then be recovered from the wet synthesis gas stream 24 by conventional means, typically by condensing the steam out as water into a water recycle stream 26. Water recycle stream 26 may then be reused in the reformer process or other processes (e.g., recycled back to water stream 12.) The resulting concentrated synthesis gas 28 may then be used in the various processes, as described above, including methanol production.

Figure 2:
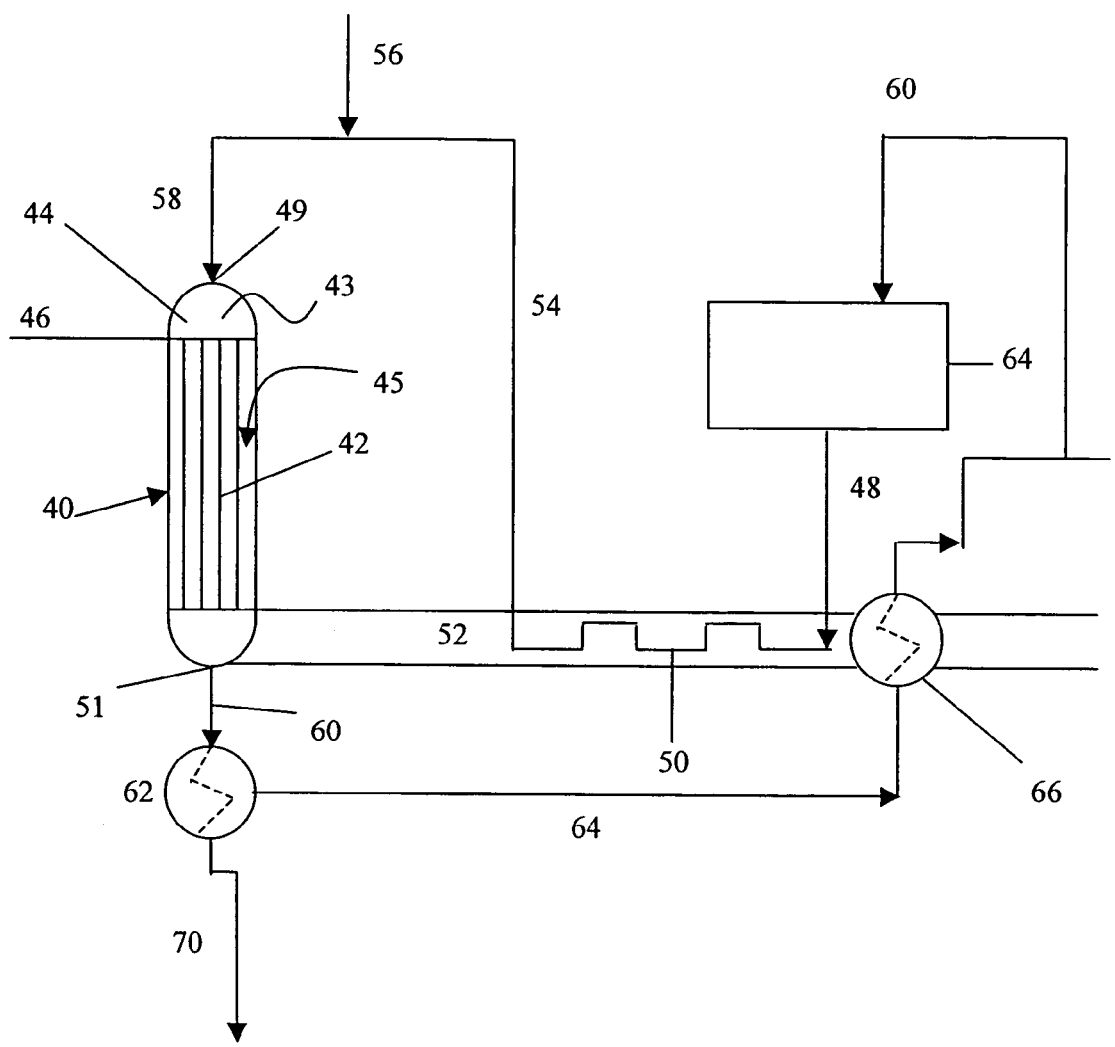
FIG. 2 is a schematic representation of an embodiment of a reformer system apparatus system described herein.

FIG. 2 provides a schematic representation of an embodiment of a modified steam reformer according to the present invention. The systems and processes described herein in which include a conventional synthesis gas production steam reformer arrangement as shown in FIG. 1 that has been altered or modified for the production of steam instead of synthesis gas and excess steam.

In the embodiment shown, a modified reformer 40 is shown having a firebox or furnace 43 in thermal communication with one or more, typically a plurality of tubes 42. A fuel gas source 44 and a combustion air source 46 are consumed within furnace 43 to provide energy (heat) to maintain modified reformer 40 at a temperature of at least about 850° C., more preferably about 850° C. to about 950°. A feed stream 48 comprising up to about 20 wt. % free water and about 80 wt. % to about 100 wt. % steam, and having a temperature of about 185° C. to about 350° C. and a pressure of about 1,025 kPa to about 2,170 kPa is supplied to inlet 49 of modified steam reformer 40. As shown in FIG. 2, Feed stream 48 may be preheated as it travels though heat exchangers and piping 50 positioned within a hot exhaust gas outlet 52 of modified reformer 40 to produce preheated stream 54. Preheated stream 54 is preferably at a temperature of about 450° C. to about 550° C. and a pressure of about 1,825 kPa to about 2,170 kPa.

Water stream 56 may also provide water to preheated stream 54 to produce a first stream 58. In an embodiment, Water stream 56 provides water to preheated stream 54 in an amount sufficient to produce up to 20 wt. % free water in first stream 58. Preferably, the amount of water provided by water stream 56 may be any amount equal to or less than the amount necessary to provide 20 wt. % free water in first stream 58.

In certain embodiments, the amount of water provided by water stream 56 is an amount sufficient to produce first stream 58 in a saturated state. In other embodiments, the amount of water provided by water stream 56 is an amount sufficient to provide first stream 58 with about 1 wt. % to about 20 wt. % free water. In additional embodiments, the amount of water provided by water stream 56 is an amount sufficient to provide first stream 58 with about 5 wt. % to about 15 wt. % free water. In still other embodiments, the amount of water provided by water stream 56 is an amount sufficient to provide first stream 58 with about 5 wt. % to about 10 wt. % free water.

First stream 58 provided to reformer inlet 49 preferably has a temperature above 185° C., preferably first stream 58 has a temperature of about 185° C. to about 550° C., more preferably first stream 58 has a temperature of about 450° C. to about 550° C.

First stream 58 preferably has a pressure of at least about 1150 kPa, preferably first stream 58 has a pressure of about 1150 kPa to about 4600 kPa, with a pressure of about 1,825 kPa to about 2,170 kPa being more preferred.

At least a portion of first stream 58, preferably all of first stream 58 is then directed through reformer inlet 49, through the plurality of tubes 42, and then removed from modified reformer 40 through reformer outlet 51. In the processes and systems described herein, tubes 42 in modified reformer 40 provide a residence space for first stream 58 to absorb the heat energy generated within furnace 43 of modified reformer 40 to produce a second stream 60 comprising about 100 wt. % water in the form of steam, preferably superheated steam, which exits modified reformer 40 through reformer outlet 51.

In a preferred embodiment, essentially all of second stream 60 is super heated steam. Preferably, second stream 60 has a temperature of at least about 760° C., preferably of about 760° C. to about 900° C. and a pressure of at least about 1150 kPa, more preferably about 1,150 kPa to about 4,600 kPa.

Tubes 42 need be in thermal communication with a heat source. Accordingly, tubes 42 need be comprised of a thermally conductive material. Tubes 42 are preferably comprised of iron alloys (steel), preferably so called super alloys which inhibit corrosion and provide efficient heat transfer. In an embodiment, tubes 42 may comprise a heat resistant alloy, preferably Paralloy available from Doncasters Ltd, Melbourne or the like.

In an embodiment, tubes 42 do not provide a catalytic reaction. As such, the molecular composition of first stream 58 is identical to the molecular composition of second stream 60. The only process which takes place with modified steam reformer 40 is the increase in temperature and/or a phase change from liquid water to steam.

In another embodiment, tubes 42 may comprise a packing material 45 which provides a turbulent flow within first stream 58 as it is heated within tubes 42. Accordingly, packing material 45 may include any material which improves heat transfer between furnace 43 (and thus tubes 42) and first stream 58. In an embodiment, packing material 45 may include conventional reformer catalyst. Packing material 45 may thus provide flow characteristics within tubes 42 that function to ensure mixing and even heating of first stream 58. Tubes 42 may also be modified to increase surface area, to impart turbulent flow, or the like to improve the efficiency of heat transfer between furnace 43 and first stream 58.

In another embodiment, packing material 45 may comprise particles of an inert material positioned and arranged within tubes 42 to provide turbulent flow, and thus to ensure even heat transfer to first stream 54. In an embodiment, packing material may comprise ceramic balls, cylinders, saddles, pellets, and/or the like, including those commercially available under the designation Denstone from Norton Chemical Product Division.

Packing material 45 preferably comprises balls or pellets having diameters of about 8 mm to about 50 mm. In another embodiment, tubes 42 may contain packing material 45 comprising natural stones or gravel.

Upon exiting modified reformer 40 through reformer outlet 51, second stream 60 may then used to provide a source of steam and heat for various uses throughout an industrial complex.

In the embodiment depicted in FIG. 2, second stream 60 is shown directed to a heat exchanger 62 where a portion of the energy value of second stream 60 is transferred to a utility stream 64 which may be a boiler feed water stream at a temperature of about 90° C. to about 300° C. and pressure of about 1,825 kPa to about 4,600 kPa. Utility Stream 64 may then be directed to another heat exchanger 66 positioned in within the exhaust gas 52 of modified reformer 40 to further increase the temperature of utility stream 64. Eventually, utility stream 64 may then be directed to a steam separation device 68, wherein utility stream 64 may be combined with make-up water to produce feed stream 48. In doing so, at least a portion of the heat provided by second stream 60 may be recycled back into modified reformer 40.

As is also shown in FIG. 2, upon exiting heat exchanger 62, stream 60 becomes third stream 70, preferably having a temperature of about 225° C. to about 350° C. and a pressure of about 1150 kPa to about 2170 kPa with sufficient heat content to be effectively used as a source of steam for various uses throughout the industrial complex in which the reformer is situated. In one embodiment, stream 70 is used in whole or in part as a facility steam system supply.

Figure 3:
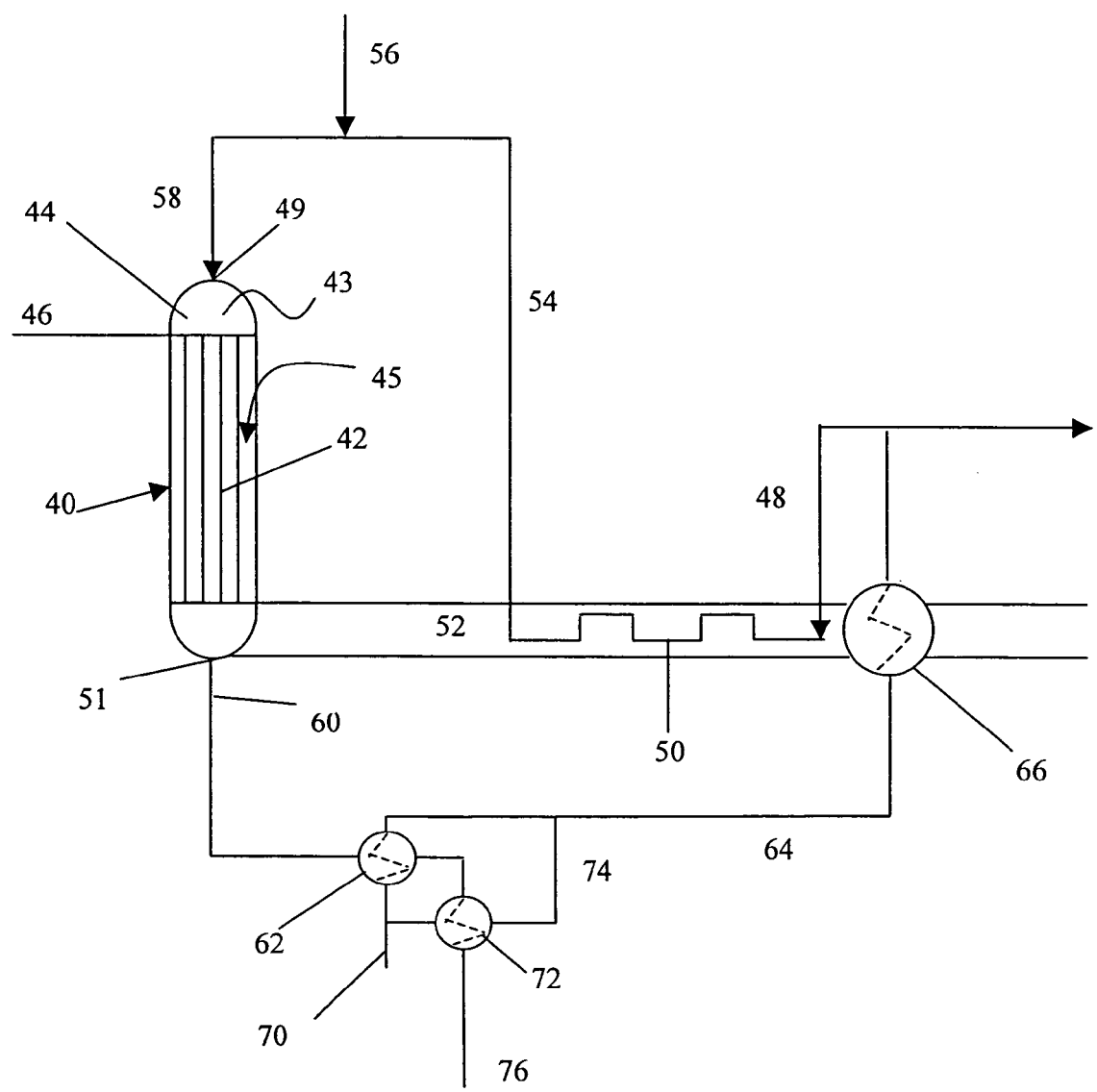
FIG. 3 is a schematic representation of an embodiment of a reformer system apparatus system described herein.

The embodiment shown in FIG. 3 provides a schematic representation of another embodiment of the systems and processes described herein in which the conventional synthesis gas production reformer arrangement in FIG. 1 is altered for the production of steam.

Similar to FIG. 2, second stream 60 may be routed through heat exchanger 62, third stream 70 may then routed through another heat exchanger 72 to transfer even more heat to utility water stream 64, which may be a boiler feed water stream. Instead of a sensible heat transfer mechanism as may be found in heat exchanger 62, heat exchanger 72 may be a latent heat exchanger, a condensate heat exchanger, or the like. The non-condensed final steam 76 exiting exchanger 72 may still have sufficient heat content to be effectively used as a source of steam for various uses throughout the industrial complex in which the reformer is situated. In one embodiment, final stream 76 is used in whole or in part as facility steam system supply.

Modeling of the design depicted in FIG. 2, indicates was conducted using a standard "Davey Reformer" consistent with the designs circa 1978. The modeling indicates that 77,000 kg/hr to 113,000 kg/hr of 1,825 kPa steam at 275° C. may be produced using a 291 million BTU per hour reformer. The heat input required was determined to be from about 60 MW to 88 MW. Other sized reformers will have proportional outputs with similar ratioed heat inputs.

With respect to the various ranges set forth herein, any upper limit recited may, of course, be combined with any lower limit for selected sub-ranges.

For purposes of foreign filing, the embodiments of the present invention include:

1a. A process for generating steam comprising:
(i) supplying a first stream to a steam reformer,
wherein the first stream comprises essentially 100 wt. % water;
has a temperature of about 185° C. or greater;
a pressure of about 1150 kPa or greater; and
at least about 50 wt % of the first stream is in the form of steam;
wherein the steam reformer comprises a reformer inlet in fluid communication with a reformer outlet, and at least one tube arranged between, and in fluid communication with the reformer inlet and the reformer outlet; and
wherein the at least one tube is in thermal communication with a furnace of the steam reformer;
(ii) heating at least a portion of said first stream within said at least one tubes to produce a second stream comprising essentially 100 wt % steam at a temperature of about 760° C. or greater and at a pressure of 1150 kPa or greater such that the molecular composition of the first stream is identical to the molecular composition of second stream; and
(iii) removing said second stream from said outlet of said steam reformer.

2a. The process of 1a wherein the at least one tube comprises paralloy.

3a. The process of 1a or 2a, wherein the at least one tube comprises a plurality of tubes.

4a. The process of any of 1a-3a, wherein an inert packing material is dimensioned and arranged with the at least one tube to provide a turbulent flow within the first stream.

5a. The process of 4a, wherein the packing material includes conventional reformer catalyst.

6a. The process of 4a or 5a, wherein the packing material comprises particles of an inert material.

7a. The process of any one of 4a-6a, wherein the packing material comprises ceramic balls, cylinders, saddles, pellets, or a combination thereof.

8a. The process of any one of 4a-7a, wherein the packing material comprises balls or pellets having a diameters of about 8 mm to about 50 mm.

9a. The process of any one of 4a-8a, wherein the packing material comprises natural stones, gravel, or a combination thereof.

10a. The process of any of 1a-9a, wherein the first stream comprises from about 0 wt. % to about 20 wt. % free water carried by steam at a temperature of about 185° C. or greater o about 230° C. and a pressure of 1150 kPa to about 2170 kPa.

11a. The process of any of 1a-10a, wherein the first stream comprises from about 20 wt. % or less free water.

12a. The process of any of 1a-11a, wherein the first stream comprises about 5 to 15 wt % free water.

13a. The process of any of 1a-12a, wherein the first stream comprises about 5 to about 10 wt % free water.

14a. The process of any of 1a-13a, wherein the first stream is at a temperature of about 185° C. to about 550° C.

15a. The process of any of 1a-14a, wherein the first stream is a temperature of about 450° C. to about 550° C.

16a. The process of any of 1a-15a wherein the first stream is at a pressure of about 1150 kPa to about 4600 kPa.

17a. The process of any of 1a-16a wherein the first stream is at a pressure of about 1150 kPa to about 2170 kPa.

18a. The process of any of 1a-17a wherein the second stream consists essentially of superheated steam.

19a. The process of any of 1a-18a wherein the second stream is at a temperature of about 760° C. to about 900° C. and a pressure of 1150 kPa to about 4600 kPa.

20a. The process of any of 1a-19a wherein the first stream is heated using an exhaust gas from the steam reformer furnace prior to providing the first stream to the steam reformer.

21a. The process of any of 1a-20a wherein the first stream is heated in the steam reformer to produce the second stream at an efficiency of at least 80%.

22a. The process of any of 1a-21a further comprising the step of cooling the second stream in a thermal heat exchanger to a temperature of about 200° C. to about 320° C. following removal of the second stream from the steam reformer.

23a. The process of 22a wherein the second stream is cooled in the thermal heat exchanger with boiler feed water.

24a. A process for generating steam comprising:
(i) supplying a first stream to a steam reformer,
wherein the first stream comprises essentially 100 wt. % water;
has a temperature of about 450° C. to about 550° C.;
a pressure of about 1150 kPa to about 4600 kPa; and
at least about 80 wt % of the first stream is in the form of steam;
wherein the steam reformer comprises a reformer inlet in fluid communication with a reformer outlet, and a plurality of tubes are arranged between, and in fluid communication with the reformer inlet and the reformer outlet;
wherein an inert packing material is dimensioned and arranged with each of the plurality of tubes to provide a turbulent flow within the first stream, the packing material comprising ceramic balls, cylinders, saddles, pellets, natural stones, natural gravel, or a combination thereof having a diameters of about 8 mm to about 50 mm; and wherein the tubes are in thermal communication with a furnace of the steam reformer;
(ii) heating at least a portion of said first stream within said at least one tubes to produce a second stream comprising essentially 100 wt % superheated steam at a temperature of about 760° C. or greater and at a pressure of 1150 kPa or greater such that the molecular composition of the first stream is identical to the molecular composition of second stream; and
(iii) removing said second stream from said outlet of said steam reformer.

25a. A system for producing steam comprising:
supplying a first stream to a steam reformer wherein the first stream comprises essentially 100 wt. % water;
has a temperature of about 185° C. or greater and a pressure of about 1150 kPa or greater, wherein at least about 80 wt % of the first stream is in the form of steam;
means for heating the first stream in the steam reformer to produce a second stream having a higher temperature than the first stream wherein the molecular composition of the first stream is identical to the molecular composition of second stream; and means for removing the second stream from an outlet of the steam reformer.

26a. A steam reformer for producing steam comprising a reformer inlet in fluid communication with a reformer outlet, and a plurality of tubes arranged between, and in fluid communication with the reformer inlet and the reformer outlet;

wherein an inert packing material is dimensioned and arranged with each of the plurality of tubes to provide a turbulent flow within the first stream, the packing material comprising ceramic balls, cylinders, saddles, pellets, natural stones, natural gravel, or a combination thereof having a diameters of about 8 mm to about 50 mm; and wherein the tubes are in thermal communication with a furnace of the steam reformer.

All patents and publications, including priority documents and testing procedures, referred to herein are hereby incorporated by reference in their entireties.

Although the various embodiments and their advantages have been described in detail, it should be understood that various changes, substitutions, and alterations could be made without departing from the spirit and scope of the inventions as defined by the following claims.

What we claim is:

1. A process for generating steam comprising:
   (i) supplying a first stream to a retrofitted steam reformer, wherein the first stream consists essentially of water;
   has a temperature of about 185° C. or greater;
   a pressure of about 1150 kPa or greater; and
   at least about 50 wt % of the first stream is in the form of steam;
      wherein the retrofitted steam reformer comprises a reformer inlet in fluid communication with a reformer outlet, and at least one tube arranged between, and in fluid communication with the reformer inlet and the reformer outlet;
      wherein the at least one tube is in thermal communication with a furnace of the retrofitted steam reformer; and
      wherein the at least one tube is a reformer section of the retrofitted steam reformer in which prior to being retrofitted, a feed stock of the steam reformer, being operated on to produce synthesis gas, would have been contacted with a catalyst in the presence of heat to effect a reformation process such that the feed stock would have been converted into a product of the steam reformer;
   (ii) heating at least a portion of said first stream within said at least one tube to produce a second stream consisting essentially of steam at a temperature of about 760° C. or greater and at a pressure of 1150 kPa or greater such that the molecular composition of the first stream is identical to the molecular composition of second stream; and
   (iii) removing said second stream from said outlet of said retrofitted steam reformer,
      wherein the only process which takes place within the retrofitted steam reformer is the increase in temperature and/or phase change of the first stream from liquid water to steam.

2. The process of claim 1 wherein the at least one tube comprises a heat resistant alloy.

3. The process of claim 1, wherein the at least one tube comprises a plurality of tubes.

4. The process of claim 1, wherein an packing material is dimensioned and arranged with the at least one tube to provide a turbulent flow within the first stream.

5. The process of claim 4, wherein the packing material includes conventional reformer catalyst.

6. The process of claim 4, wherein the packing material comprises particles of an inert material.

7. The process of claim 4, wherein the packing material comprises ceramic balls, cylinders, saddles, pellets, or a combination thereof.

8. The process of claim 4, wherein the packing material comprises balls or pellets having a diameters of about 8 mm to about 50 mm.

9. The process of claim 4, wherein the packing material comprises natural stones, gravel, or a combination thereof.

10. The process of claim 1, wherein the first stream comprises from about 0 wt % to about 20 wt. % free water carried by steam at a temperature of about 185° C. or greater of about 230° C. and a pressure of 1150 kPa to about 2170 kPa.

11. The process of claim 1, wherein the first stream comprises from about 20 wt. % or less free water.

12. The process of claim 11, wherein the first stream comprises about 5 to 15 wt % free water.

13. The process of claim 12, wherein the first stream comprises about 5 to about 10 wt % free water.

14. The process of claim 1, wherein the first stream is at a temperature of about 185° C. to about 550° C.

15. The process of claim 1, wherein the first stream is a temperature of about 450° C. to about 550° C.

16. The process of claim 1 wherein the first stream is at a pressure of about 1150 kPa to about 4600 kPa.

17. The process of claim 1 wherein the first stream is at a pressure of 1150 kPa to about 2170 kPa.

18. The process of claim 1 wherein the second stream consists essentially of superheated steam.

19. The process of claim 1 wherein the second stream is at a temperature of about 760° C. to about 900° C. and a pressure of 1150 kPa to about 4600 kPa.

20. The process of claim 1 wherein the first stream is heated using an exhaust gas from the retrofitted steam reformer furnace prior to providing the first stream to the retrofitted steam reformer.

21. The process of claim 1 wherein the first stream is heated in the retrofitted steam reformer to produce the second stream at an efficiency of at least 80%.

22. The process of claim 1 further comprising the step of cooling the second stream in a thermal heat exchanger to a temperature of about 200° C. to about 320° C. following removal of the second stream from the retrofitted steam reformer.

23. The process of claim 22 wherein the second stream is cooled in the thermal heat exchanger with boiler feed water.

24. A process for generating steam comprising:
   (i) supplying a first stream to a retrofitted steam reformer, wherein the first stream consists essentially of water;
   has a temperature of about 450° C. to about 550° C.;
   a pressure of about 1150 kPa to about 4600 kPa; and
   at least about 80 wt % of the first stream is in the form of steam;
      wherein the retrofitted steam reformer comprises a reformer inlet in fluid communication with a reformer'outlet, and a plurality of tubes are arranged between, and in fluid communication with the reformer inlet and the reformer outlet;
      wherein an inert packing material is dimensioned and arranged with each of the plurality of tubes to provide a turbulent flow within the first stream, the packing material comprising ceramic balls, cylinders, saddles, pellets, natural stones, natural gravel, or a combination thereof having a diameters of about 8 mm to about 50 mm; and
      wherein the tubes are in thermal communication with a furnace of the retrofitted steam reformer;

wherein the plurality of tubes are a reformer section of the retrofitted steam reformer in which prior to being retrofitted, a feed stock of the steam reformer, being operated on the produce synthesis gas, would have been contacted with a catalyst in the presence of heat to effect a reformation process such that the feed stock would have been converted into a product of the steam reformer;

(ii) heating at least a portion of said first stream within said plurality of tubes to produce a second stream consisting essentially of superheated steam at a temperature of about 760° C. or greater and at a pressure of 1150 kPa or greater such that the molecular composition of the first stream is identical to the molecular composition of second stream; and (iii) removing said second stream from said outlet of said retrofitted steam reformer, wherein the only process which takes place within the retrofitted steam reformer is the increase in temperature and/or phase change of the first stream from liquid water to steam.

* * * * *